United States Patent
Inaoka

(10) Patent No.: US 8,636,326 B2
(45) Date of Patent: Jan. 28, 2014

(54) CRAWLER TRAVEL UNIT

(75) Inventor: Motonari Inaoka, Fujiidera (JP)

(73) Assignee: Kubota Corporation, Osaka (JP)

( * ) Notice: Subject to any disclaimer, the term of this patent is extended or adjusted under 35 U.S.C. 154(b) by 134 days.

(21) Appl. No.: 12/523,108

(22) PCT Filed: Jun. 6, 2007

(86) PCT No.: PCT/JP2007/061436
§ 371 (c)(1),
(2), (4) Date: Jan. 12, 2010

(87) PCT Pub. No.: WO2008/087753
PCT Pub. Date: Jul. 24, 2008

(65) Prior Publication Data
US 2010/0148573 A1 Jun. 17, 2010

(30) Foreign Application Priority Data
Jan. 15, 2007 (JP) .................................. 2007-006405

(51) Int. Cl.
*B62D 55/14* (2006.01)
*B62D 55/084* (2006.01)

(52) U.S. Cl.
USPC ............ 305/131; 305/125; 305/132; 305/135

(58) Field of Classification Search
USPC ......... 305/124, 125, 127, 128, 129, 130, 131, 305/132, 135, 142, 143, 145, 146; 180/9.26
See application file for complete search history.

(56) References Cited

U.S. PATENT DOCUMENTS

| | | | |
|---|---|---|---|
| 1,522,157 A * | 1/1925 | James et al. | 180/9.5 |
| 2,057,211 A | 10/1936 | Shere | |
| 5,273,126 A | 12/1993 | Reed et al. | |
| 5,725,292 A | 3/1998 | Keedy et al. | |
| RE36,284 E | 8/1999 | Kelderman | |
| 6,199,646 B1 | 3/2001 | Tani et al. | |
| 6,564,889 B1 | 5/2003 | Yamazaki et al. | |
| 6,607,256 B2 * | 8/2003 | Yoshida et al. | 305/132 |
| 6,655,482 B2 | 12/2003 | Simmons | |
| D497,621 S * | 10/2004 | Inaoka et al. | D15/28 |
| 6,890,042 B2 * | 5/2005 | Inaoka et al. | 305/173 |

(Continued)

FOREIGN PATENT DOCUMENTS

| | | |
|---|---|---|
| DE | 19727084 A1 | 1/1998 |
| EP | 1514775 A1 | 3/2005 |
| JP | 09207831 A | 8/1997 |
| JP | 11029073 A | 2/1999 |
| JP | 11034940 A | 2/1999 |
| JP | 2000233774 A | 8/2000 |
| JP | 2001048065 A | 2/2001 |
| JP | 3560893 B2 | 9/2001 |
| JP | 2001239968 A | 9/2001 |
| JP | 2002002558 A | 1/2002 |
| JP | 2003081144 A | 3/2003 |
| WO | 9108941 A1 | 6/1991 |

*Primary Examiner* — Kip T Kotter
(74) *Attorney, Agent, or Firm* — The Webb Law Firm

(57) ABSTRACT

A track frame is swingably supported by a rear axle case of a travel machine body through a rocking shaft; front and rear driven wheels are disposed in front and rear end portions of the track frame; at least three idling wheels are disposed on an intermediate portion of the track frame at intervals in a longitudinal direction; a drive wheel which is disposed upward of a longitudinal intermediate portion of the track frame and is configured to receive a power transmitted from a rear axle supported by the rear axle case; and a crawler belt is wrapped around the drive wheel, the front driven wheel, the rear driven wheel and the idling wheels. Two idling wheels on a rear side of the at least three idling wheels are pivoted on a first rocking link, and a longitudinal intermediate portion of the first rocking link is pivoted on the track frame through a first pivot shaft.

7 Claims, 7 Drawing Sheets

(56) References Cited

U.S. PATENT DOCUMENTS

| | | | |
|---|---|---|---|
| 7,025,429 B2 * | 4/2006 | Yoshida et al. | 305/132 |
| 7,328,760 B2 * | 2/2008 | Inaoka et al. | 180/9.21 |
| 2002/0003376 A1 | 1/2002 | Yoshida et al. | |
| 2003/0116366 A1 | 6/2003 | Simmons | |
| 2005/0060918 A1 | 3/2005 | Inaoka et al. | |

* cited by examiner

CRAWLER TRAVEL UNIT

BACKGROUND OF THE INVENTION

1. Field of the Invention

The present invention relates to a crawler travel unit mountable on a rear portion of a tractor or the like.

2. Description of Related Art

As a crawler travel unit, there can be mentioned those used in a semi-crawler tractor, in which the unit is installed as a rear wheel tire of the tractor, or replaceable with a rear wheel tire.

In the prior art of the crawler travel unit of this type, for example, as disclosed in Patent document 1, a front driven wheel for adjusting tension, a driven wheel which loosely rotates and idling wheels therebetween are aligned in a front-rear direction and supported by a track frame; a drive wheel is arranged upward of the idling wheels; a crawler track is wrapped around all of these wheels; a tension adjusting mechanism for supporting the front driven wheel and biasing the same in a direction that adjusts tension is sloping downward from the track frame to the front driven wheel; the track frame is made swingable about an axis which is in parallel with an axis of the drive wheel and positioned downward of the axis; a swing range regulating means for setting a swing range of the track frame is disposed on a driven wheel side relative to the swing axis; the front driven wheel, driven wheel and idling wheels are supported by respective support shafts cantilevered outward from the track frame; and at least the support shaft of the idling wheel is sloping outward and downward.

Three idling wheels arranged in a front-rear direction are separately supported by the track frame through the respective wheel shafts.

Patent document 1: Japanese Patent JP3560893B

SUMMARY OF THE INVENTION

In the above-mentioned prior art, when a tractor travels on a flat ground, the three idling wheels arranged in the front-rear direction together support a load, by being brought into contact with the ground at the same time through the crawler track. However, when front and rear idling wheels run on obstacles, such as stones, an intermediate idling wheel may be lifted and cannot support the load, i.e., the entire load is supported solely by the two (front and rear) idling wheels.

Especially, in a case where a load is on a rear portion of the track frame, when the front idling wheel runs on an obstacle, such as stone, a load on the rearmost idling wheel becomes excessive, leading to larger vertical vibration of the track frame.

The object of the present invention is to provide a crawler travel unit that solves the above-mentioned problems of the prior arts.

In a first feature according to the present invention, the crawler type travel unit includes: a rear axle case of a travel machine body; a track frame swingably supported by the rear axle case through a rocking shaft; a front driven wheel disposed on a front end portion of the track frame; a rear driven wheel disposed on a rear end portion of the track frame; at least three idling wheels aligned between the front driven wheel and the rear driven wheel at intervals in a longitudinal direction; a rear axle supported by the rear axle case; a drive wheel which is disposed upward of a longitudinal intermediate portion of the track frame and is configured to receive a power transmitted from the rear axle; and a crawler belt wrapped around the drive wheel, the front driven wheel, the rear driven wheel and the idling wheels, wherein each of two idling wheels on a rear side of the at least three idling wheels is pivoted on a first rocking link, and a longitudinal intermediate portion of the first rocking link is pivoted on the track frame through a first pivot shaft.

In a second feature of the crawler type travel unit according to the present invention, the at least three idling wheels is four idling wheels composed of the two idling wheels on the rear side and two idling wheels on a front side relative to the two idling wheels on the rear side, and each of the two idling wheels on the front side is pivoted on a second rocking link, and a longitudinal intermediate portion of the second rocking link is pivoted on the track frame through a second pivot shaft.

In a third feature of the crawler type travel unit according to the present invention, the at least three idling wheels is three idling wheels composed of the two idling wheels on the rear side and one idling wheel on a front side relative to the two idling wheels on the rear side, a horizontal distance during contact with the ground between a center of the rocking shaft and a center of a spindle of the front driven wheel is set longer than a horizontal distance between the center of the rocking shaft and a center of a spindle of the rear driven wheel, and the rocking shaft is disposed downward of a center of the drive wheel, so as to give an upward force to a front portion of the travel unit when tension is applied to the crawler belt, and a horizontal distance between the center of the rocking shaft and a center of the first pivot shaft is set shorter than a horizontal distance between the center of the rocking shaft and a wheel shaft of the idling wheel on the front side.

In a fourth feature of the crawler type travel unit according to the present invention, a horizontal distance during contact with the ground between a center of the rocking shaft and a center of a spindle of the front driven wheel is set longer than a horizontal distance between the center of the rocking shaft and a center of a spindle of the rear driven wheel, and the rocking shaft is disposed downward of a center of the drive wheel, so as to give an upward force to a front portion of the travel unit when tension is applied to the crawler belt, and a horizontal distance between the center of the rocking shaft and a center of the first pivot shaft is set shorter than a horizontal distance between the center of the rocking shaft and a center of the second pivot shaft.

In a fifth feature of the crawler type travel unit according to the present invention, the rocking shaft is disposed at a position immediately below a center of the drive wheel and optionally displaced frontward from the position.

In a sixth feature of the crawler type travel unit according to the present invention, the first pivot shaft of the first rocking link has a height which is substantially the same as a height of a wheel shaft of each of the idling wheels on the rear side, and is arranged in the middle between the wheel shafts.

In a seventh feature of the crawler type travel unit according to the present invention, the second pivot shaft of the second rocking link has a height which is substantially the same as a height of a wheel shaft of each of the idling wheels on the front side, and is arranged in the middle between the wheel shafts.

In an eighth feature of the crawler type travel unit according to the present invention, a tension adjusting mechanism configured to support the front driven wheel and to bias the front driven wheel in a direction that adjusts tension is provided on a front portion of the track frame, and the tension adjusting mechanism includes: an axle support configured to support a spindle of the front driven wheel from both sides of the spindle; and a pair of right and left tension springs configured to frontward bias the axle support.

The crawler travel unit having the above-mentioned configurations has the following effects.

For example, when the idling wheel on the front side runs on an obstacle M, such as stone, two idling wheels on the rear side each pivoted on the first rocking link are brought into contact with the ground at the same time due to the swing of the rocking link, and therefore, the load on the rear portion of the track frame is shared by the two idling wheels on the rear side, and the load on the idling wheel on the front side can be reduced as well.

In addition, when the idling wheel on the front side of the two rear idling wheels runs on an obstacle, the rearmost idling wheel is lowered due to the seesaw-like swing of the rocking link, which suppresses the lifting of the pivot shaft of the rocking link, and then suppresses vibration of the track frame.

According to the present invention, when the idling wheel on the front side runs on an obstacle, such as stone, two idling wheels on the rear side are brought into contact with the ground at the same time due to the swing of the rocking link, and therefore, the load is shared by the two idling wheels on the rear side. The load on the idling wheel on the front side, in addition to the load on the idling wheel on the rear side, can be reduced as well, and vertical vibration of the track frame can be reduced.

The present invention can be utilized as a crawler travel unit mountable on a rear portion of a tractor or the like.

DESCRIPTION OF THE PREFERRED EMBODIMENTS

Embodiments of the present invention will be described below with reference to the drawings. Various embodiments will be disclosed, and a combination of a feature of one embodiment with a feature of another embodiment is also encompassed in the present invention.

EXAMPLE 1

Figure 7:
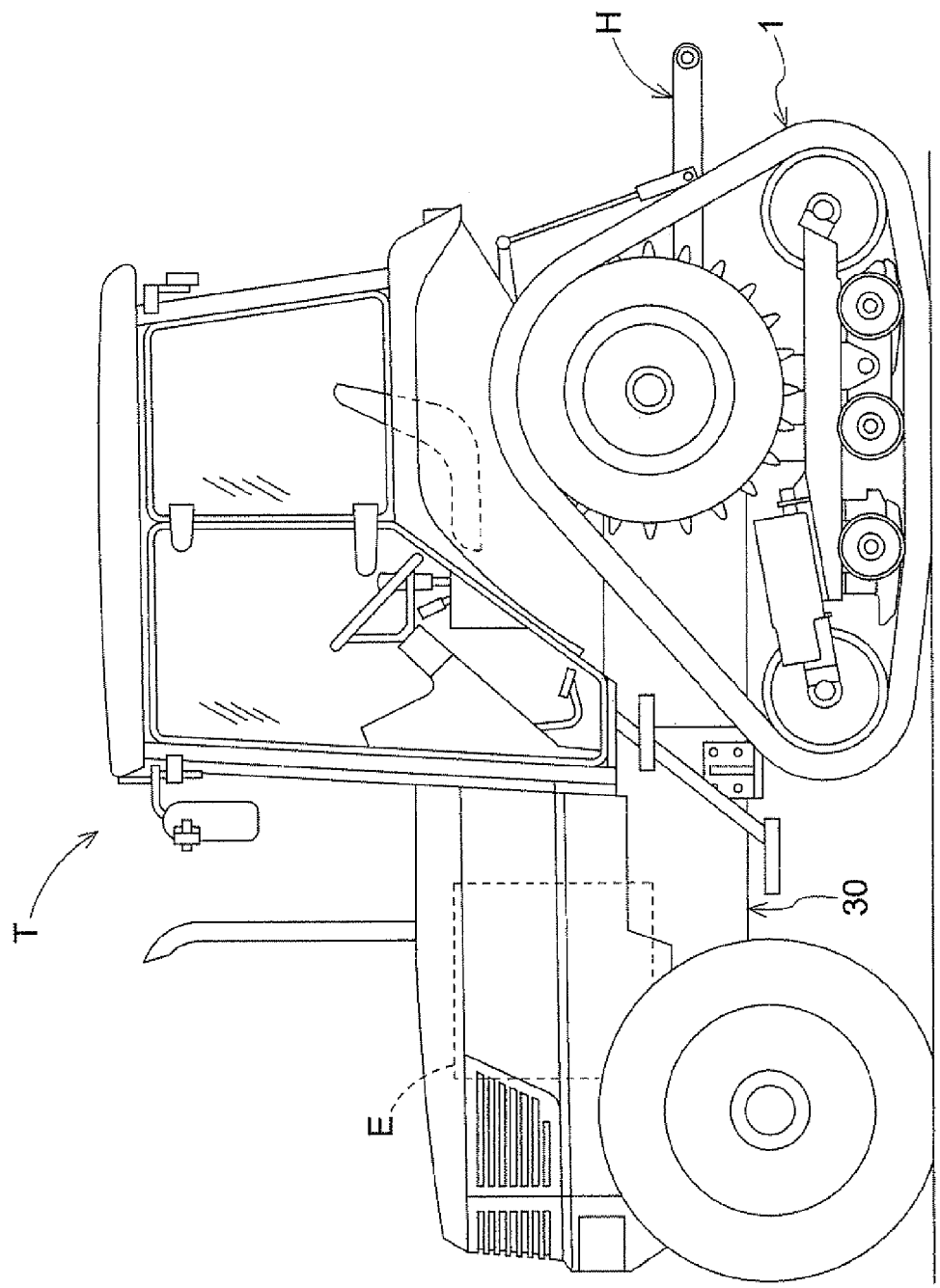
FIG. 7 is a side view showing an entire tractor.

FIGS. 1 to 5 and 7 illustrate a first embodiment. In FIG. 7, an entire tractor T is shown. The tractor T with a crawler travel unit 1 has a travel machine body 30. The travel machine body 30 includes an engine E, a transmission case 31, a front axle frame (not shown) and the like. The tractor T has a front wheel as a steering control wheel which can be power-driven, attached to the front axle frame. The engine is covered with a bonnet, and an operation part and a driver's seat are held in a cabin or ROPS. In a rear portion of the travel machine body 30, a rear working machine (implement), such as a rotary cultivator, is towed or supported through a hydraulic pressure device and a three-point link mechanism (H). Hereinbelow, the descriptions will be made with reference to the drawings showing a left side of the crawler travel unit 1, but the corresponding members are similarly arranged on a right side of the crawler travel unit 1.

The crawler travel unit 1 has: a track frame 2 made of a squared column material, plate material, pipe material or the like; a front driven wheel (adjusting wheel) 3 configured to adjust tension; a rear driven wheel 4 which loosely rotates; and idling wheels 5 arranged between the front driven wheel 3 and the rear driven wheel 4, with these wheels being aligned in a front-rear direction and supported by the track frame 2. A drive wheel 6 is arranged upward of the idling wheels 5, and a crawler belt 7 is wrapped around the front driven wheel (adjusting wheel) 3, the rear driven wheel 4, the idling wheels 5 and the drive wheel 6. The track frame 2 is swingable about a rocking shaft 8 which is in parallel with an axis of the drive wheel 6 and positioned downward of the axis.

The front driven wheel 3 is rotatably supported through a support shaft 3A by a free end of a downward sloping tension adjusting mechanism 9 which is attached to a front end of an upper face of the track frame 2.

The tension adjusting mechanism 9 for adjusting tension of the crawler belt 7 includes: a support 11 fixed to a ramp 2a in the upper face of the track frame 2 which is frontward downslope; an axle support 10 which is supported slidably in a longitudinal direction by the support 11 and in turn supports a spindle 3A of the front driven wheel 3; a tension spring 12 configured to bias the axle support 10 to a front driven wheel 3 side; and a sag correction unit 13 configured to shift the axle support 10 to the front driven wheel 3 side to thereby absorb loosening of the crawler belt 7, if any. A numeral 17 in FIG. 1 indicates a cover over the tension adjusting mechanism 9.

The axle support 10 includes: a support plate 10a which is in parallel with the support 11; a pair of right and left bearings 10b protruding from a front face of the support plate 10a, which is for supporting the spindle 3A from right and left sides; and a pair of right and left guide rods 10c protruding from a rear face of the support plate 10a, which are inserted into corresponding holes in the support 11. On each of the right and left guide rods 10c, the tension spring 12 is disposed.

The sag correction unit 13 includes: an inner cylinder 14 fixed to the rear face of the support plate 10a of the axle support 10; an outer cylinder 15 which is fixed to the ramp 2a and fits onto the inner cylinder 14; a pusher 16 which is disposed inside the inner cylinder 14 and configured to push the axle support 10 frontward relative to the support 11. The pusher 16 has a hydraulic structure configured to prevent the axle support 10 from regressing by intrusion of grease thereinto, when the crawler belt 7 is loosened and the axle support 10 shifts frontward. It should be noted that the pusher 16 may be a push screw type.

The inner cylinder 14 and the outer cylinder 15, each in a shape of a cylinder, are fitted to each other, with the inner cylinder 14 slidable in the outer cylinder 15, and form a yoke part for supporting the front driven wheel 3. Accordingly, as compared with a case where each of the inner cylinder 14 and the outer cylinder 15 is in a squared cylinder shape, gaps can be made smaller and thus rattling sound and friction can be reduced.

The pair of the guide rods 10c side by side serve as stopper for preventing a rotational movement of the axle support 10. The right and left guide rods 10c have the respective tension springs 12 provided thereon, which together serve as a double suspension structure to support the front driven wheel 3, leading to increase in a right-left direction stability and a lasting quality in tension adjustment by the front driven wheel 3.

Figure 4:
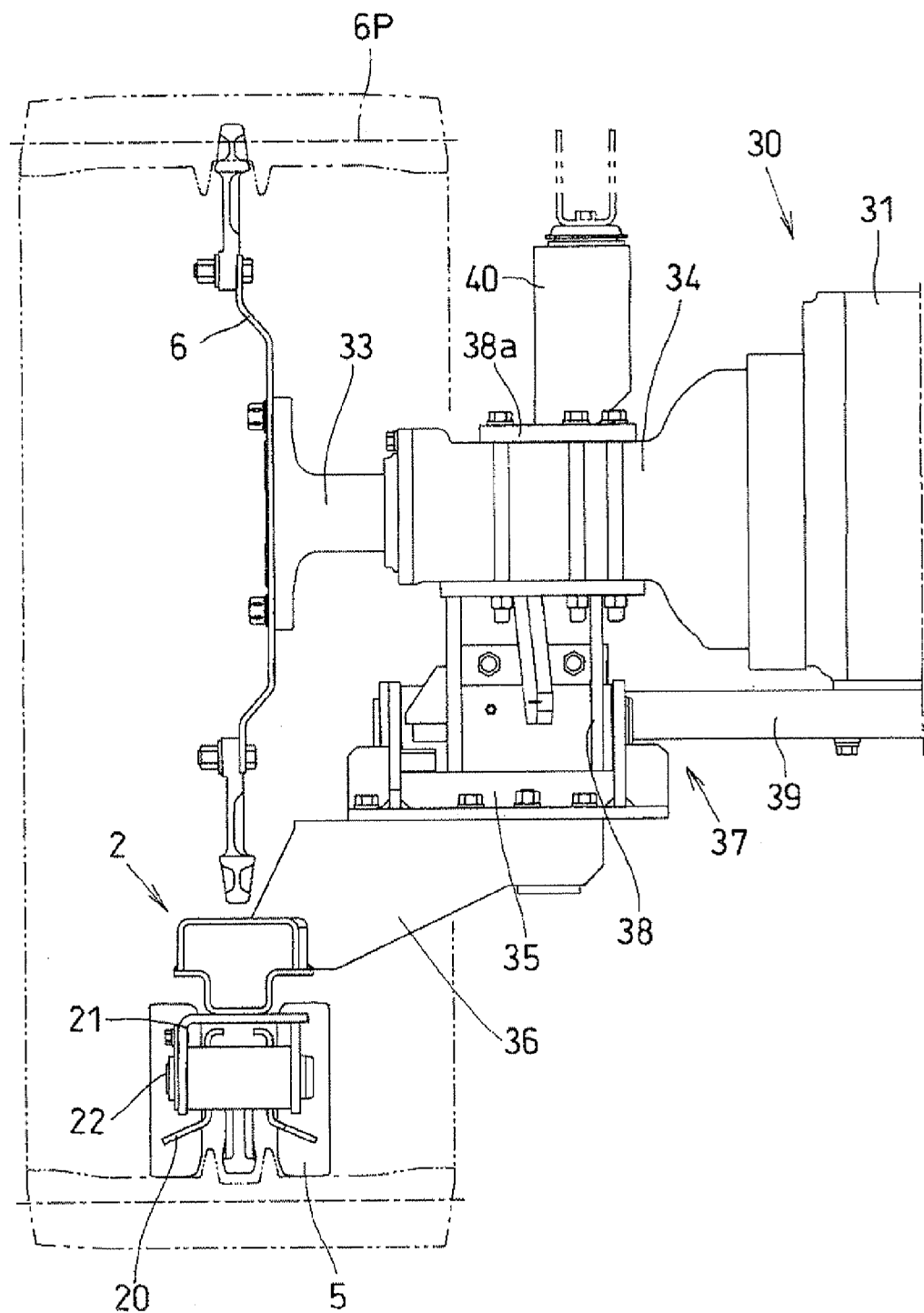
FIG. 4 is a cross sectional rear view thereof.

A rear end of the track frame 2 is in a two-pronged shape, by which a spindle 4A of the rear driven wheel 4 is rotatably supported through a pair of right and left bearings 18. In addition and as shown in FIG. 4, the track frame 2, as seen in vertical section from behind, has an upper section with a larger right/left width and a lower section with a smaller right/left width. The idler wheels 5 extend across a right/left width of the track frame 2 so that the idler wheels 5 are located on lateral sides of the smaller-width lower section and below lateral sides of the larger-width upper section.

The idling wheels 5 has a smaller diameter than those of the front driven wheel 3 and the rear driven wheel 4, and three idling wheels 5 supported by corresponding wheel shafts 5A are arranged on the track frame 2 at intervals in the front-rear direction. As best shown in FIG. 4, each idling wheel 5 is formed of a pair of idling wheels arranged side by side with a gap therebetween. Each of this pair of idling wheels may be rotatable independently of each other, or may be rotatable uniformly.

Of the idling wheels 5, one idling wheel 5 on a front side has the wheel shaft 5A supported through a single bracket 24 (FIG. 2) fixed to a lower face of the track frame 2. Of the idling wheels 5, two idling wheels 5 on a rear side (positioned at an intermediate portion and a rear portion) have the respective wheel shafts 5A pivoted on a rocking link 20. A longitudinal intermediate portion of the rocking link 20 is pivoted swingably in a seesaw manner, through a pivot shaft 22, on a bracket 21 fixed to the track frame 2. The rocking link 20 is also called "equalizer link", "swing arm", "balance (scale) link", or "swing member".

Figure 1:
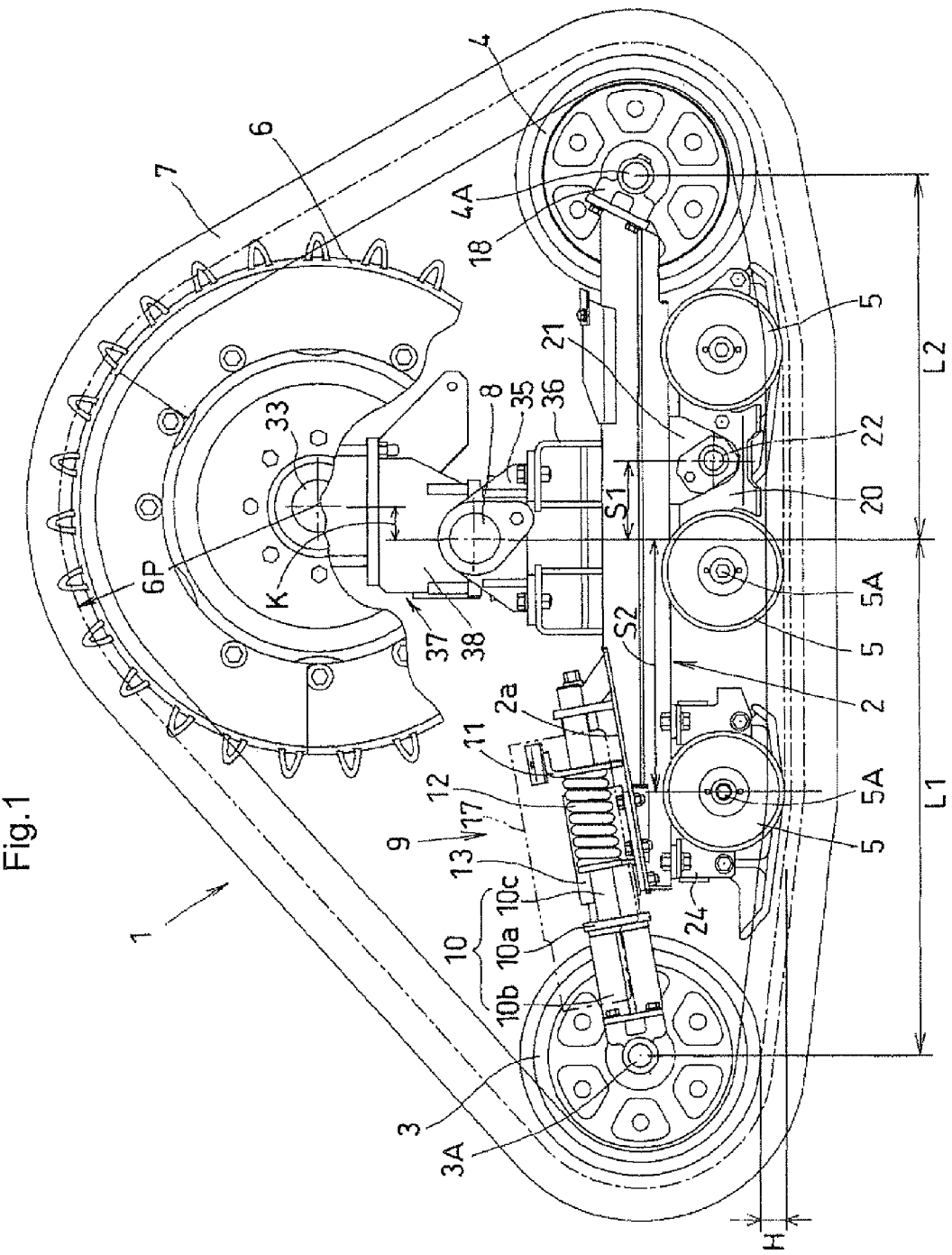
FIG. 1 is a side view showing a first embodiment of the present invention.
Figure 2:
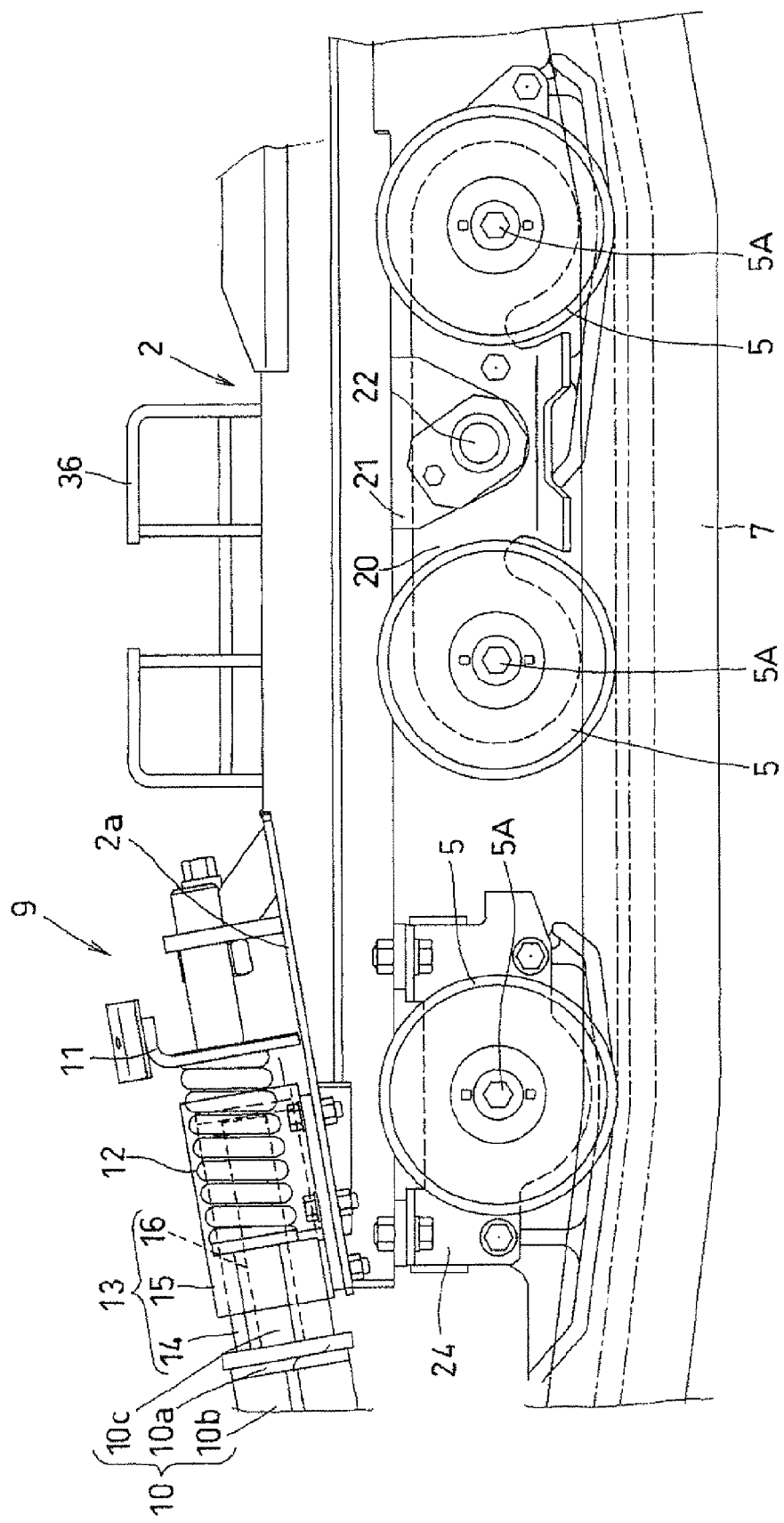
FIG. 2 is an enlarged side view of a relevant part thereof
Figure 3:
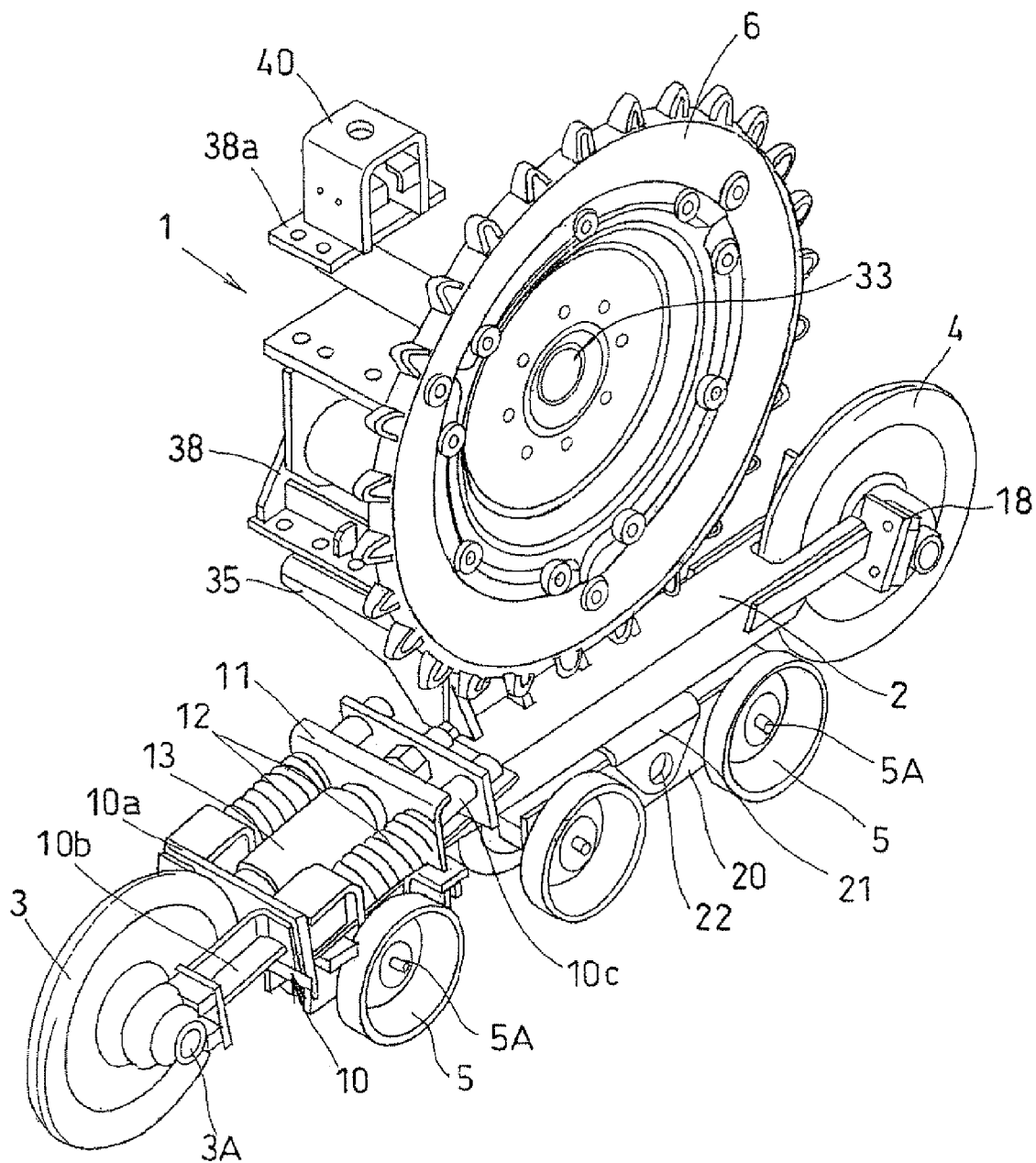
FIG. 3 is a perspective view of a relevant part thereof.
Figure 5:
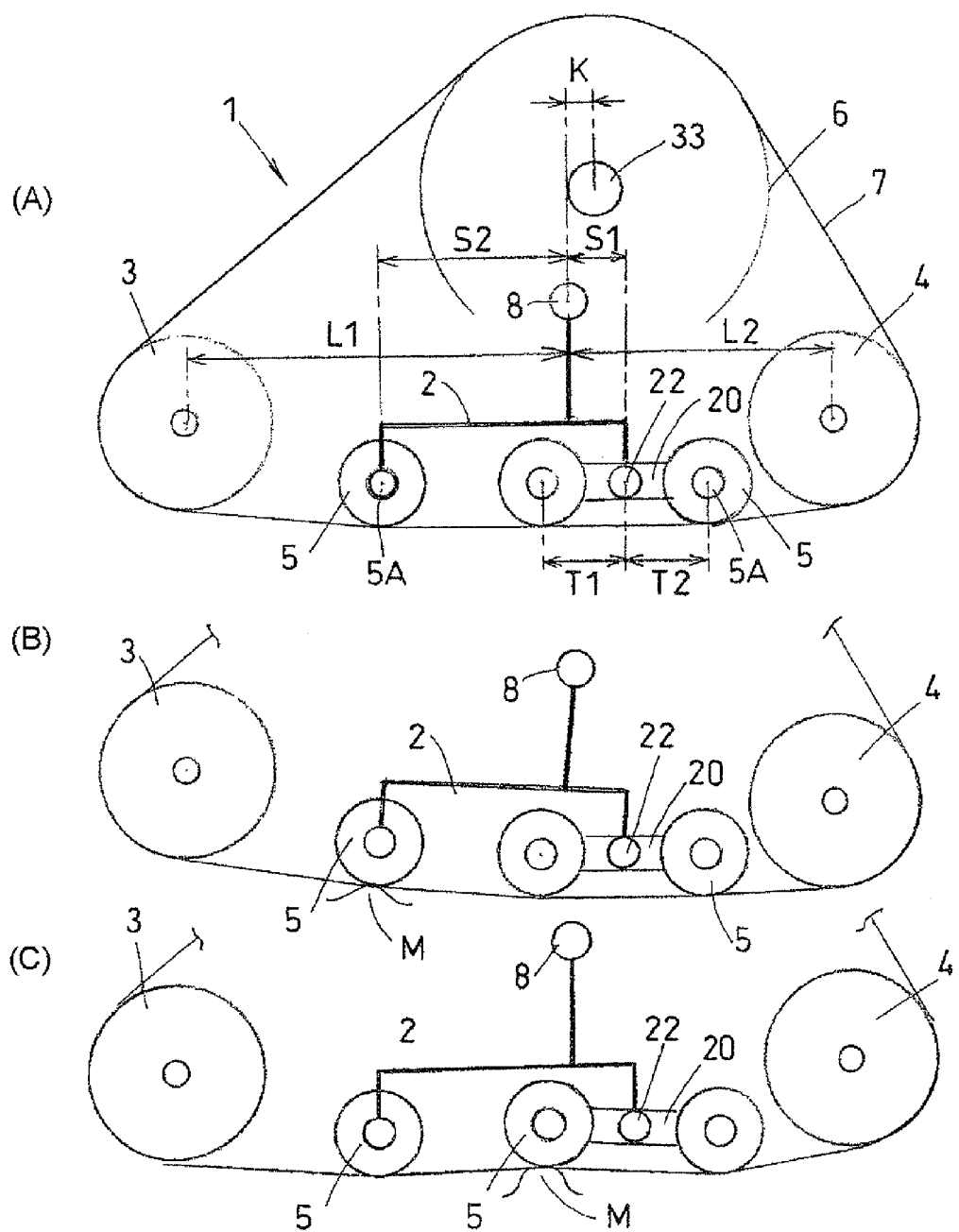
FIG. 5 shows diagrams illustrating an equalizer effect of idling wheels.

A height of the pivot shaft 22 of the rocking link 20 may be, as shown in FIGS. 1 and 2, set higher than a height of the wheel shaft 5A of the idling wheel 5, or may be, as shown in FIG. 5, set substantially the same as the height of the wheel shaft 5A of the idling wheel 5. In addition, in the drawing, a distance T1 from the pivot shaft 22 to the intermediate idling wheel 5 and a distance T2 from the pivot shaft 22 to the rear idling wheel 5 are set the same, and alternatively, one of them may be set longer than the other. In this specification, unless otherwise specifically defined, a distance between two members means a distance between a center of one member and a center of the other.

A horizontal distance S1 between the rocking shaft 8 and the pivot shaft 22 of the rocking link 20 is set shorter than a horizontal distance 82 between the rocking shaft 8 and the wheel shaft 5A of the front idling wheel 5, so that the load is supported by the track frame 2, mainly with the two rear idling wheels 5, rather than with the front idling wheel 5.

The drive wheel 6 is a sprocket (a drive transmission member in a shape of a disk with cogs on an outer circumference thereof) fitted to an outer end face of a rear axle (driving shaft) 33. The rear axle 33 is supported by a rear axle case 34 protruding laterally from a rear portion of the transmission case 31 forming the travel machine body 30 and outward protrudes further from the rear axle case 34. In the case of a tractor with wheels, a tire is attached instead of the drive wheel 6.

A pitch circle diameter 6P of the drive wheel 6 is set approximately half of a diameter of an outer circumference of the tire, and in a power transmission system of the front wheel, a decelerator is incorporated in order to make a circumferential velocity of the front wheel approximately equivalent to that of the drive wheel 6. It should be noted that there may be installed a transmission for making the circumferential velocity of the front wheel larger than the circumferential velocity of the drive wheel 6.

Since the drive wheel 6 is arranged upward of the idling wheel 5, the drive wheel 6, the front driven wheel 3 and the rear driven wheel 4 form a triangle shape, with the drive wheel 6 corresponding to an upper vertex of the triangle, and the front driven wheel 3 and the rear driven wheel 4 corresponding to lower vertices. When wrapped around all of the wheels, the crawler belt 7 is arranged in a shape of an approximate triangle as a side view, with the idling wheel 5 positioned on a base of the approximate triangle. The crawler belt 7 is also called "(elastic) caterpillar", or "endless track".

The crawler belt 7 may be a crawler belt made of iron, and alternatively, may be a crawler track made of rubber with tensile bodies embedded therein in a circumferential direction, as in the present case. In a center portion in a width direction, engagement holes for engaging with cogs (engagement protrusions) of the drive wheel 6 are formed at even intervals in a circumferential direction. In an outer circumferential ground contact surface, a plurality of protruding lugs with a set pattern are formed, while in an inner periphery, protrusions for preventing wheel detachment are formed. As for the set pattern of lugs, various shapes can be used, including those of the prior arts, such as linear bars each extending in a transverse direction, and pairs of longitudinally extending linear bars each pair having a space therebetween which becomes larger towards a rear portion. The crawler belt 7 may have cored bars as tensile body each extending in the width direction, which are embedded at even intervals in a circumferential direction.

On the track frame 2, there stands an extending stage 36 formed of a plate material extending from a main body of the track frame 2 to a travel machine body 30 side. On the extending stage 36, a swing support 35 is fixed with bolts, while an upper portion of the swing support 35 is supported by the rocking shaft 8 which is a horizontal and transversal shaft supported by a reinforcing frame 37.

The reinforcing frame 37 includes: mounting frames 38 fixed to the corresponding right and left rear axle cases 34 with bolts; and a connecting member 39 which is fixed to a lower face of the transmission case 31 with bolts and is connected to the corresponding mounting frames 38 at right and left ends of the connecting member 39. On a top stop plate 38a of the mounting frame 38, a cabin support stage 40 is mounted.

The rocking shaft 8 is attached to the mounting frames 38 located on both sides in the reinforcing frame 37, and the swing support 35 is swingably fitted to the rocking shaft 8. An axis of the rocking shaft 8 is in parallel with an axis of the rear axle 33 and located downward of the axis of the rear axle 33. The axis of the rocking shaft 8 may be located at a position immediately below the rear axle 33, and alternatively may be further displaced frontward by a distance K from the position immediately below the rear axle 33, and serves as a swing center of the track frame 2 in the front-rear direction (vertical direction at the front and rear ends of the track frame 2).

In the crawler travel unit 1 in a shape of an approximate triangle as a side view, a horizontal distance between the rear axle 33 and the front driven wheel 3 is set longer than a horizontal distance between the rear axle 33 and the rear driven wheel 4, and a horizontal distance L1 between the rocking shaft 8 and the front driven wheel 3 is set longer than a horizontal distance L2 between the rocking shaft 8 and the rear driven wheel 4.

In the case where the axis of the rocking shaft 8 is located at the position immediately below the rear axle 33 or displaced frontward from the position, and at the same time, where the horizontal distance L1 frontward of the axis of the rocking shaft 8 of the crawler travel unit 1 is made longer to some extent than the horizontal distance rearward, if the crawler travel unit 1 is lifted and tension is applied to the crawler belt 7, a front portion of the crawler travel unit 1 tends to be lifted to balance tensions, between tension from the drive wheel 6 to the front driven wheel 3, and tension from the drive wheel 6 to the rear driven wheel 4. When the crawler travel unit 1 is brought into contact with the ground under this condition, an upward force is given to the front portion of the travel unit. Because of this upward force, running on the obstacle is facilitated, which enhances a traveling performance of the crawler travel unit 1 on the farm ground, leading to increase in a travel stability and a traction power.

As shown in FIGS. 1 and 4, the front and rear driven wheels 3,4 are positioned higher than a horizontal tangent line of the idling wheels 5 on a ground side (i.e., an inner periphery of the crawler belt 7) by a height H, and even when the front driven wheel 3 is shifted away and downward from a center of the crawler belt 7 by the tension adjustment, the front driven wheel 3 is always kept above the tangent line.

The function of the three idling wheels 5 according to the first embodiment will be described in detail with reference to FIGS. 1, 2 and 5.

When traveling on a flat ground as shown in FIG. 5(A), like in the prior art, three wheels are brought into contact at the same time with the crawler belt 7, i.e., the farm ground.

When the front idling wheel 5 runs on an obstacle M as shown in FIG. 5(B), the rocking link 20 swings in a seesaw manner and exerts an effect of distributing the load (which is called "equalizer effect"), and the rear idling wheel 5 and also the intermediate idling wheel 5 are brought into contact with the ground at the same time. Since the horizontal distance S1 between the rocking shaft 8 and the pivot shaft 22 is shorter than the horizontal distance S2 between the rocking shaft 8 and the front idling wheel 5, the load on the pivot shaft 22 becomes larger and the load on the front idling wheel 5 becomes smaller in the case of the present invention where the load is supported by the front idling wheel 5 and the pivot shaft 22, as compared with the conventional case where the load is supported by two wheels, i.e., the front idling wheel 5 and the rear idling wheel 5.

The thus exerted larger load is shared at the same time by the intermediate idling wheel 5 and the rear idling wheel 5, through the rocking link 20 pivoted on the pivot shaft 22. Since the load is shared by the intermediate idling wheel 5 and the rear idling wheel 5, the load on the rear idling wheel 5 becomes smaller, as compared with the conventional case where the load is supported by two wheels, i.e., the front idling wheel 5 and the rear idling wheel 5.

Therefore, when the front idling wheel 5 runs on the obstacle M, three wheels share the load, and the load on the front idling wheel 5 becomes relatively small, which reduces the load that tends to suppress a lifting force on a front driven wheel 3 side.

Accordingly, by setting the horizontal distance L1 during contact with the ground between the rocking shaft 8 and the front driven wheel 3 longer than the horizontal distance L2 between the rocking shaft 8 and the rear driven wheel 4, an upward force is imparted to the front portion of the travel unit when tension is applied to the crawler belt 7. As a result, it is secured that running on an obstacle in paddy field or wet paddy becomes smooth, and that a traveling performance is enhanced. In addition, since the rear idling wheel 5 does not give a localized large load to the crawler belt 7, damage on the inner periphery of the crawler belt 7 is reduced.

When the intermediate idling wheel 5 runs on the obstacle M as shown in FIG. 5(C), the rocking link 20 swings and the intermediate idling wheel 5 and also the rear idling wheel 5 are brought into contact with the ground at the same time. Since the pivot shaft 22 is located between the intermediate idling wheel 5 and the rear idling wheel 5, like in the case where the front idling wheel 5 runs on the obstacle M, a vertical movement of the pivot shaft 22 supporting the rocking link 20 becomes smaller than a vertical movement of the intermediate idling wheel 5 in the conventional case where the load is supported by two wheels, i.e., the front idling wheel 5 and the rear idling wheel 5. As a result, vibration of the travel machine body 30 is reduced.

When the intermediate idling wheel 5 runs on the obstacle M, not just one but both of the front idling wheel 5 and the rear idling wheel 5 are brought into contact with the ground and thus both share the load; when the rear idling wheel 5 runs on the obstacle M, not only the front idling wheel 5 but also the intermediate idling wheel 5 is brought into contact with the ground and thus both share the load, which reduces the maximum load per wheel.

Figure 6:
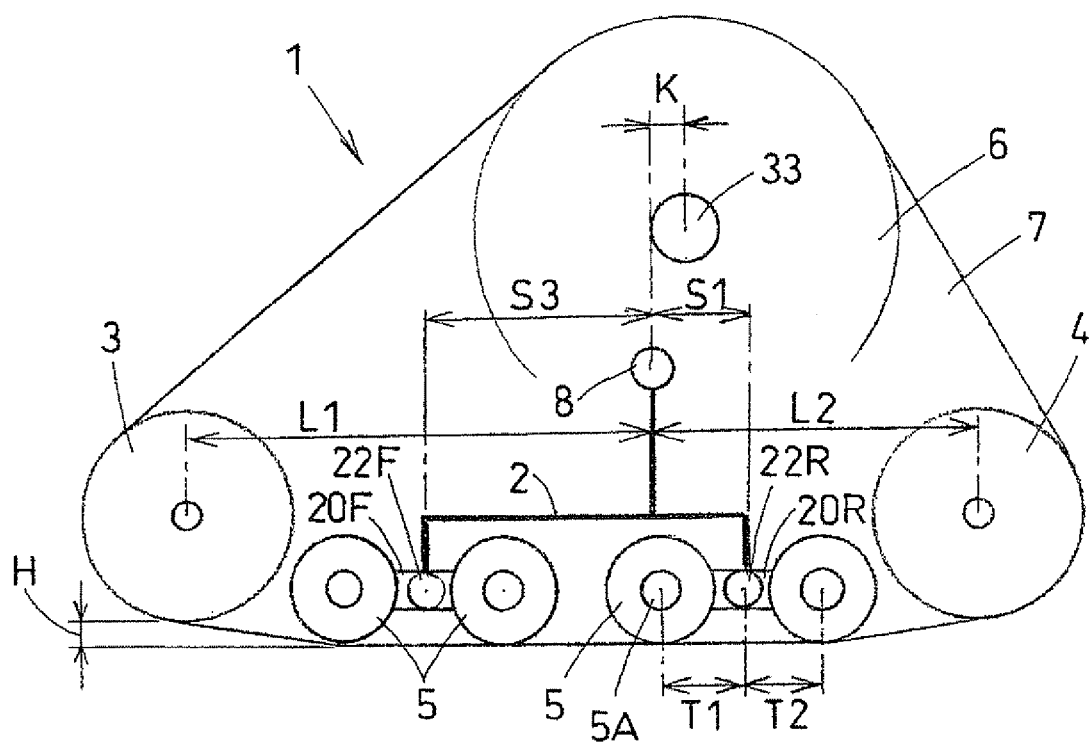
FIG. 6 is a diagram showing a second embodiment.

FIG. 6 illustrates a second embodiment. The intermediate portion of the track frame 2 has four idling wheels 5 aligned at intervals in the front-rear direction. Two idling wheels 5 on the front side and two idling wheels 5 on the rear side are pivoted on rocking links 20F,20R, respectively. Longitudinal intermediate portions of the respective rocking links 20F,20R are pivoted on the track frame 2, through pivot shafts 22F, 22R, respectively. The horizontal distance S1 between the rocking shaft 8 and the rear pivot shaft 22R is set shorter than a horizontal distance S3 between the rocking shaft 8 and the front pivot shaft 22F.

The two idling wheels 5 on the rear side pivoted on the rocking link 20R on the rear side have the same load-supporting effect as that of the first embodiment; and the two idling wheels 5 on the front side pivoted on the rocking link 20F on the front side also have a similar effect to the above.

In combination with the fact that front and rear driven wheels 3,4 are positioned higher than the horizontal tangent line of the idling wheel 5 on a ground side by the height H, since the four idling wheels 5 including the front and rear wheels are pivoted on the respective front and rear rocking links 20F,20R, the load is shared by bringing the four idling wheels 5 into contact with the ground at the same time due to the above-described equalizer effect. As a result, the load on the rocking link 20F can be reduced, and vibration of the track frame 2 can be suppressed.

It should be noted that, the above-mentioned embodiment of the present invention would be most preferable when the shapes of the members and the positional relationships in terms of the front-rear, lateral and vertical directions are as illustrated in FIGS. 1 to 6. However, the present invention is not limited to the embodiments described above, and the members and configurations may be altered, or various combinations thereof may be adopted.

For example, the rocking shaft 8 may be disposed at a position below the center of the drive wheel 6, and at the same time, far backward from a position immediately below, as long as an upward force is given to the front portion when tension is applied to the crawler belt 7. When the idling wheels 5 are composed of four wheels, only the two rear wheels may be supported by the rocking link 20, and the remaining two front wheels may be separately supported by the track frame 2.

INDUSTRIAL APPLICABILITY

The present invention can be utilized as a crawler travel unit mountable on a rear portion of a tractor or the like.

The invention claimed is:
1. A crawler type travel unit comprising:
a rear axle case of a travel machine body;
a track frame swingably supported by said rear axle case through a rocking shaft;

a front driven wheel disposed on a front end portion of said track frame;

a rear driven wheel disposed on a rear end portion of said track frame;

three idling wheels aligned between said front driven wheel and said rear driven wheel at intervals in a longitudinal direction;

a rear axle supported by said rear axle case;

a drive wheel which is disposed upward of a longitudinal intermediate portion of said track frame and is configured to receive power transmitted from said rear axle; and a crawler belt wrapped around said drive wheel, said front driven wheel, said rear driven wheel and said idling wheels, wherein a horizontal distance during contact with the ground between a center of the rocking shaft and a center of a spindle of said front driven wheel is set longer than a horizontal distance between the center of the rocking shaft and a center of a spindle of said rear driven wheel, and said rocking shaft is disposed downward of a center of said drive wheel, so as to give an upward force to a front portion of said travel unit when tension is applied to said crawler belt;

wherein said rocking shaft is disposed at a position immediately below a center of said drive wheel and displaced frontward from the position;

wherein each of two idling wheels on a rear side of said three idling wheels is pivoted on a first rocking link, and a longitudinal intermediate portion of said first rocking link is pivoted on said track frame through a first pivot shaft;

wherein a horizontal distance between said center of said rocking shaft and said center of the first pivot shaft is set shorter than a horizontal distance between said center of said rocking shaft and a wheel shaft of the idling wheel on a front side, and a wheel shaft of a forward one of the two rear idling wheels pivoted on the first rocking link is arranged forwardly of the rocking shaft, so as to support a load acting on the track frame by the two rear idling wheels;

wherein, as seen in vertical section from behind, the track frame has an upper section with a larger right/left width and a lower section with a smaller right/left width; and wherein the idler wheels extend across a right/left width of the track frame so that the idler wheels are located on lateral sides of the smaller-width lower section and directly below lateral sides of the larger-width upper section.

2. The crawler type travel unit according to claim 1, wherein each of the front driven wheel and the rear driven wheel has a diameter larger than a diameter of each of the idling wheels, and wherein said first pivot shaft of said first rocking link has a height which is substantially the same as a height of a wheel shaft of each of said idling wheels on the rear side, and is arranged in the middle between said wheel shafts.

3. The crawler type travel unit according to claim 1, further comprising:

a tension-adjusting mechanism provided on a front portion of said track frame and configured to support said front driven wheel and to bias said front driven wheel in a direction that adjusts tension, said tension-adjusting mechanism including: an axle support configured to support a spindle of said front driven wheel from both sides of said spindle; and a pair of right and left tension springs configured to frontward bias the axle support.

4. A crawler type travel unit comprising:

a rear axle case of a travel machine body;

a track frame swingably supported by said rear axle case through a rocking shaft;

a front driven wheel disposed on a front end portion of said track frame;

a rear driven wheel disposed on a rear end portion of said track frame;

four idling wheels aligned between said front driven wheel and said rear driven wheel at intervals in a longitudinal direction;

a rear axle supported by said rear axle case;

a drive wheel which is disposed upward of a longitudinal intermediate portion of said track frame and is configured to receive power transmitted from said rear axle; and a crawler belt wrapped around said drive wheel, said front driven wheel, said rear driven wheel and said idling wheels, wherein said four idling wheels are composed of the two idling wheels on the rear side and two idling wheels on a front side relative to the two idling wheels on the rear side;

wherein each of two idling wheels on a rear side of said four wheels is pivoted on a first rocking link, and a longitudinal intermediate portion of said first rocking link is pivoted on said track frame through a first pivot shaft;

wherein each of the two idling wheels on the front side is pivoted on a second rocking link, and a longitudinal intermediate portion of said second rocking link is pivoted on said track frame through a second pivot shaft;

wherein a horizontal distance during contact with the ground between said center of said rocking shaft and said center of said spindle of said front driven wheel is set longer than a horizontal distance between said center of said rocking shaft and said center of said spindle of said rear driven wheel, and said rocking shaft is disposed downward and forward of said center of said drive wheel, so as to give an upward force to a front portion of said travel unit when tension is applied to said crawler belt;

wherein a horizontal distance between said center of said rocking shaft and said center of said first pivot shaft is set shorter than a horizontal distance between said center of said rocking shaft and said center of said second pivot shaft;

wherein, as seen in vertical section from behind, the track frame has an upper section with a larger right/left width and a lower section with a smaller right/left width; and wherein the idler wheels extend across a right/left width of the track frame so that the idler wheels are located on lateral sides of the smaller-width lower section and directly below lateral sides of the larger-width upper section.

5. The crawler type travel unit according to claim 4, wherein each of the front driven wheel and the rear driven wheel has a diameter larger than a diameter of each of the idling wheels, and wherein said first pivot shaft of said first rocking link has a height which is substantially the same as a height of a wheel shaft of each of said idling wheels on the rear side, and is arranged in the middle between said wheel shafts.

6. The crawler type travel unit according to claim 5, wherein said second pivot shaft of said second rocking link has a height which is substantially the same as a height of said wheel shaft of each of said idling wheels on the front side, and is arranged in the middle between said wheel shafts.

7. The crawler type travel unit according to claim 4, further comprising:
a tension-adjusting mechanism provided on a front portion of said track frame and configured to support said front driven wheel and to bias said front driven wheel in a direction that adjusts tension,
said tension-adjusting mechanism including: an axle support configured to support a spindle of said front driven wheel from both sides of said spindle; and a pair of right and left tension springs configured to frontward bias the axle support.

* * * * *

UNITED STATES PATENT AND TRADEMARK OFFICE
CERTIFICATE OF CORRECTION

PATENT NO.        : 8,636,326 B2                                    Page 1 of 1
APPLICATION NO.   : 12/523108
DATED             : January 28, 2014
INVENTOR(S)       : Motonari Inaoka It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 445 days.

Signed and Sealed this

Twenty-second Day of September, 2015

Michelle K. Lee
*Director of the United States Patent and Trademark Office*